United States Patent [19]

Dübal et al.

[11] Patent Number: 5,166,304
[45] Date of Patent: Nov. 24, 1992

[54] USE OF POLYARYL ETHER KETONES AS ALIGNMENT LAYERS

[75] Inventors: Hans-Rolf Dübal, Königstein/Taunus, Fed. Rep. of Germany; Mikio Murakami, Kakegawa, Japan; Hans-Otto Drotloff; Michael Brekner, both of Frankfurt am Main, Fed. Rep. of Germany

[73] Assignee: Hoechst Aktiengesellschaft, Frankfurt am Main, Fed. Rep. of Germany

[21] Appl. No.: 644,883

[22] Filed: Jan. 23, 1991

[30] Foreign Application Priority Data

Jan. 25, 1990 [DE] Fed. Rep. of Germany ....... 4002082

[51] Int. Cl.$^5$ .................. C08G 8/02; C08G 14/00
[52] U.S. Cl. .................... 528/125; 528/126; 528/128; 528/220; 528/298; 528/299; 428/1
[58] Field of Search ............. 528/125, 126, 128, 220, 528/298, 299; 428/1

[56] References Cited

U.S. PATENT DOCUMENTS

| | | |
|---|---|---|
| 3,725,070 | 4/1973 | Hamb et al. .................... 528/185 |
| 4,320,224 | 3/1982 | Rose et al. . |
| 4,766,197 | 8/1988 | Clendinning et al. . |
| 4,829,143 | 5/1989 | Clendinning et al. . |
| 4,954,604 | 9/1990 | Genz et al. . |
| 4,959,454 | 9/1990 | Fukuyama .................... 528/352 |
| 4,980,453 | 12/1990 | Brunelle et al. .................... 528/352 |
| 5,039,185 | 8/1991 | Uchida et al. . |

OTHER PUBLICATIONS

Cella, et al "Ring Opening Polymerization of Cyclic Ether & Thioetherimides & Sulfones", pp. 142–143, General Electric Co.
Cella, et al "The Preparation of Novel Cyclic Oligoners" pp. 581–582.

Primary Examiner—John Kight, III
Assistant Examiner—P. Hampton-Hightower
Attorney, Agent, or Firm—Curtis, Morris & Safford

[57] ABSTRACT

Use of polyaryl ether ketones comprising structural units —O—A—O—B— gives alignment layers for liquid-crystal display and switching devices which have high transparency, low water absorption capacity and particularly uniform alignment both of smectic and of nematic liquid crystals, and thus produce a high contrast capability.

8 Claims, No Drawings

USE OF POLYARYL ETHER KETONES AS ALIGNMENT LAYERS

The invention relates to the use of polyaryl ether ketones in the production of alignment layers for liquid-crystal display devices and liquid-crystal switching devices.

As is known, the combination of the effects of unusual anisotropic and fluid properties of liquid crystals has resulted in liquid crystals being used in a large number of electrooptical switching and display devices (LCDs). In these, the electrical, magnetic, elastic or thermal properties of the liquid crystals can be utilized to cause changes in alignment. Optical effects can then be achieved with the aid of birefringence, the inclusion of dyes or light scattering. To this end, both nematic and smectic liquid-crystal phases have been used hitherto. Examples of switching and display devices of this type are known from numerous publications.

Common constituents of all liquid-crystal switching devices and liquid-crystal display devices are, inter alia, outer plates, for example made of glass or plastic, coated with transparent electrodes and an alignment layer. These are joined by spacers, sealing frames, polarizers and, for color displays, thin colored filter layers. Further possible components are antireflection, passivation, leveling and barrier layers and electrical nonlinear elements, such as thin-film transistors (TFTs) and metal-insulator-metal (MIM) elements. The construction of liquid-crystal displays is described in detail, for example, in E. Kaneko, "Liquid Crystal TV Displays: Principles and Applications of Liquid Crystal Displays", KTK Scientific Publishers, Tokyo, 1987, pages 12–30 and 163–172.

Of the abovementioned constituents, the alignment layer, inter alia, is of particular importance. As is known, it has the purpose of ensuring uniform, defect-free alignment of the longitudinal molecular axes and thus high contrast. It may comprise organic polymers or alternatively, if desired, alternatively organic layers.

Organic polymer layers are usually applied to the areas to be coated in the form of polymer solutions or solutions of soluble polymer precursors by pressure, spray, immersion or spin processes and subsequently cured or dried, generally by heating the wet film. In order to achieve an alignment effect, the hard polymer layer obtained is "rubbed" with a roller coated in a velour-like manner or covered in velour or by a brush or similar device, thereby roughening the polymer surface, preferably in straight lines or in an aligned manner.

To produce electrooptical switching and display devices based on liquid crystals, polyether imides, polyvinyl alcohols and certain, preferably aliphatic, polyamides (nylon) have already been applied as alignment layers. Due to the occurrence of ageing problems when polyvinyl alcohol is used, the latter is hardly used at all today for mass production of liquid-crystal displays. In most commercially available polyether imide precursors, the imidation temperatures of the starting polyamidecarboxylic acids are above 350° C. Although such high reaction temperatures are acceptable for conventional LCD application, i.e. small-area black/white displays, for example for watches and calculators, they are, however, damaging to large-area versions of the LCDs, such as TV and computer screens. The reason for this is, on the one hand, the danger of possible flexing at high temperatures of the glass substrates coated with indium/tin oxide, and, on the other hand, the danger of thermal damage to colored filters which can occur above 200° C. Although these dangers do not generally occur with soluble polyether imides, soluble polyether imides have only inadequate adhesion to glass or to glass substrates coated with indium/tin oxide, and consequently an additional process step, namely the application of an adhesion promoter, becomes necessary. By contrast, although aliphatic polyamides, for example, do not have any adhesion or temperature problems, handling of the solvents necessary, for example cresol or formic acid, is, however, very difficult under the process conditions to be observed, i.e. cleanroom working, since they require special ventilation and extraction equipment and complex and expensive supply of fresh air via an air conditioning system. Dipolar aprotic solvents, for example N-methylpyrrolidone (B.p. 206° C.) or γ-butyrolactone could be used here, but aliphatic polyamides, for example, are insoluble or not sufficiently soluble in these solvents.

Manufacturers of liquid-crystal displays make particularly high demands of the water absorption capacity of the alignment layer, which should be as low as possible since irreversible damage may occur due to ion diffusion when semiconductor structures applied by means of thin-film technology to the semiconductor zone are used. However, the water absorption capacity of polyamides and polyether imides is very high. Ferroelectric liquid-crystal displays require in particular alignment layers which have a good contrast capability for mixtures having high spontaneous polarization $\geq 15$ nC/cm$^2$ at the operating temperature of the display) and therefore short switching times. When polyamides and polyether imides are used, however, the occurrence of twisted states at high spontaneous polarization is observed. These twisted states are not black in the dark switching state, but instead are colored, typically gray-blue. In the bright switching state they are not white, but again colored and have significantly lower brightness than in a homogeneous, i.e. untwisted, state. These colored twisting states very considerably reduce the contrast.

Commercially available polyaryl ether ketones, such as ®VICTREX PEEK or PEK from ICI Ltd., Welwyn Garden City, England, and ®KADEL from Amoco Corporation, Chicago, Ill., USA, are partially crystalline. They are polycondensates whose molecules are essentially unbranched and are built up predominantly from unsubstituted phenyl or biphenyl units which are linked to one another predominantly in the para-position by ether or carbonyl groups. They are extremely resistant to solvents and chemical attack and have high heat distortion resistance in the filled state.

If the tendency towards crystallization of such polyaryl ether ketones can be suppressed, for example by an interference in the above-outlined relatively simple, very regular chain structure, for example by incorporating an increased proportion of ortho- or meta-links of the phenyl rings, by incorporating units which contain substituted aromatic rings, amorphous polycondensates are obtained. These are soluble in conventional solvents (chloroform, N,N-dimethylacetamide, N,N-dimethylformamide or N-methyl-2-pyrrolidone). In the DSC diagram, they have only a single glass transition temperature and no melting point. From a solution or melt, they form viscous, flexible and transparent films. In contrast to, for example, polyaryl ether sulfones, which are likewise amorphous, amorphous polyaryl ether ketones have hitherto not achieved any industrial importance as thermoplastics.

The invention has the object of providing suitable alignment layers for liquid-crystal displays which can be cured at relatively low temperatures, i.e. below 200° C., have good adhesion to the substrate, high transparency and low water absorption capacity, and which facilitate particularly uniform alignment both of smectic and of nematic liquid crystals and thus enable a high contrast capability.

It has now been found that transparent, highly adherent alignment layers of low water absorption capacity which can be cured at temperatures below 200° C. and can be applied from N-methylpyrrolidone solution, γ-butylrolactone solution or the like can be obtained for smectic and nematic liquid crystals if the polymer used is an amorphous polyaryl ether ketone containing structural units of the formula I given below. These alignment layers produce particularly high contrast values for ferroelectrical liquid crystals having high values for spontaneous polarization.

The invention relates to the use of at least one polyaryl ether ketone built up from at least one structural unit of the formula I

     (I)

for alignment layers for liquid-crystal display and switching devices, where A is selected from the radicals

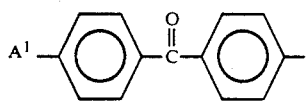

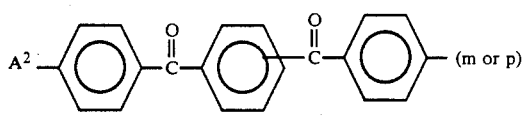

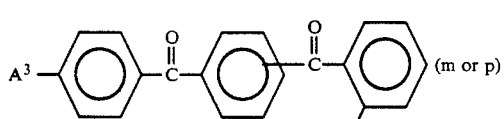

and B is selected from the radicals

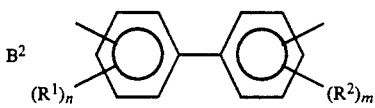

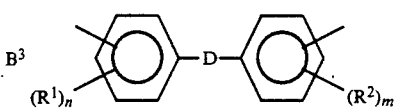

-continued

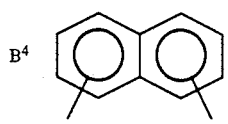

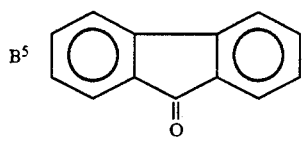

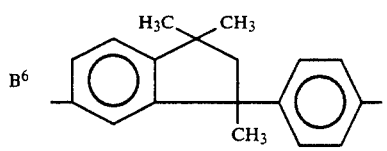

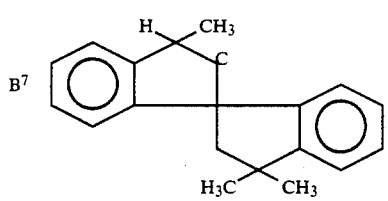

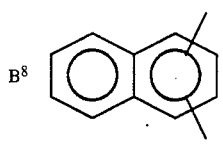

where $R^1$ and $R^2$, which are identical or different, are hydrogen, halogen, preferably bromine, $(C_1-C_8)$- alkyl or -alkoxy, preferably $(C_1-C_4)$-alkyl or -alkoxy, or are aryl or aryloxy having 6 to 12 carbon atoms in the aryl radical, m and n are identical or different and are zero or, as an integer, 1, 2, 3 or 4, preferably zero, 1 or 2, in particular zero or 2. If $R^1$ and $R^2$ in the radicals $B^2$ and $B^3$ are halogen, m and n are preferably 2. D is selected from the divalent radicals

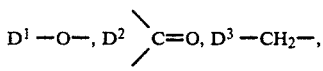

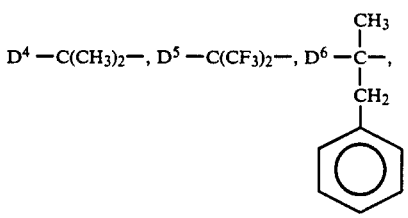

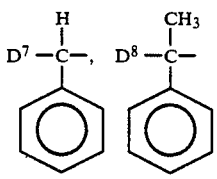

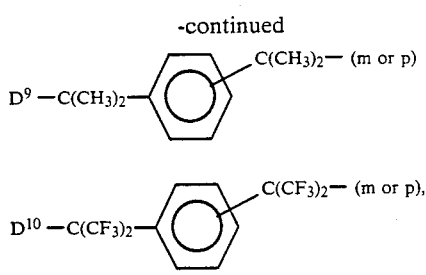

the molar ratio between the units A and B being from 0.9 to 1.1:1.0, preferably 1:1.

The polymers mentioned may be homopolycondensates, which thus contain only one unit of type A and one unit of type B per recurring unit, or copolycondensates, which contain two or more different units of type A and/or two or more different units of type B.

A is preferably selected from $A^1$ and $A^2$ and is particularly preferably $A^2$. B is preferably selected from $B^1$, $B^2$ and $B^3$, and is particularly preferably $B^3$. D is preferably $D^2$, $D^3$, $D^4$, $D^5$, $D^6$, $D^7$, $D^8$ $D^9$ or $D^{10}$, preferably linked in the para-position. $D^4$, $D^5$, $D^9$ and $D^{10}$ are particularly preferred.

If A is selected from $A^1$ and $A^2$, B is not $B^4$. If B is $B^3$ and n is zero, $D^1$ and $D^2$ are not selected in this case.

If A is $A^3$ in the structural unit of the formula (I), B is preferably $B^1$ or $B^2$ and n is zero, 1 or 2, in particular n is zero.

If the polyaryl ether ketones whose use is claimed according to the invention are not homopolycondensates, but instead copolycondensates, A is selected from $A^1$, $A^2$ and $A^3$, preferably from $A^1$ and $A^2$. A is particularly preferably $A^2$. As component B, a mixture of 0-50 mol% of $B^1$ and 50-0 mol% selected from $B^2$ to $B^8$ is employed, in particular 5-10 mol% of $B^1$ and 45-40 mol% of $B^2$, $B^3$ and $B^4$. Of these, $B^3$ is in turn particularly preferred. Likewise, A may be 0-50 mol% of $A^2$ and 50-0 mol% of $A^3$, preferably 5-30 mol% of $A^2$ and 45-20 mol% of $A^3$, Where B is $B^1$, $B^2$ or $B^4$ and, in the preferred range, is $B^1$, and n is zero.

In addition to the use of a homopolycondensate or copolycondensate, it is also possible to use polymer mixtures comprising two or more of the abovementioned homopolycondensates, one or more of the abovementioned homopolycondensates and one or more of the abovementioned copolycondensates, or two or more of the abovementioned copolycondensates.

A prerequisite for a thermoplastic being transparent is the absence of intrinsic absorption in the wavelength range concerned and the absence of refractive index fluctuations causing noticeable scattering losses. Refractive index fluctuations are caused either by physical biphasic behavior, i.e. partial crystallinity, or by chemical biphasic behavior, i.e. phase separation. Impurities may adversely effect the transparency of materials, as centers of both absorption and scattering, but, in contrast to the abovementioned factors, can be eliminated by technological measures relating to both the synthesis and the processing of the polymers.

In the polyaryl ether ketones, neither the ether group nor the ketone group result in significant delocalization of the aromatic electron shells. For this reason, the bathochromic effect of these groups is not so great as to cause notable absorption in the visible wavelength range, i.e. above 400 nm, preferably between 450 and 800 nm.

It is also known that ether and ketone groups are relatively insensitive to hydrolysis. The absence of acidic hydrogen atoms and the absence of strong dipoles at the same time as a considerable aromatic-hydrophobic character suggests a low water absorption capacity of the polyaryl ether ketones.

Aromatic polyethers can be prepared by an electrophilic polycondensation reaction (Friedel-Crafts reaction) of polynuclear aromatic acid halides (where at least one aryl radical must carry electron-donating substituents), for example a phenoxyaryl acid chloride, or by condensation of a dicarboxylic acid halide with an electron-rich aromatic compound, for example a diaryl ether (U.S. Pat. No. 3,956,240).

Another possible synthesis is nucleophilic polycondensation (nucleophilic substitution reaction) of halophenols, in which the halogen group is activated by electronegative substituents in the ortho- or para-positions, or of dihydric, mononuclear or polynuclear phenols with activated dihalogenated aromatic compounds. In the case of nucleophilic polycondensation, the phenoxide formed from the phenol by the action of alkali metals is the actual agent (German Patent 1 545 106 and Canadian Patent 847 963).

The amorphous polyaryl ether ketones used according to the invention are prepared under conventional conditions and with reaction of the reactants mentioned (monomers) by known processes, for example of aromatic dihydroxyl compounds (B') with activated aromatic dihalogenated compounds (A').

In the abovementioned case, i.e. reaction of dihydroxyl compounds (B') with activated aromatic dihalogenated compounds (A'), the molar ratio between the two reactants is normally from 0.9 to 1.1:1.0. The compounds are preferably employed in a molar ratio of 1:1 or with a slight excess of the dihalogenated compound, so this ratio is also found in the units A and B in the formula I.

Examples of suitable aromatic dihydroxyl compounds (B,) are mononuclear diphenols of the formula

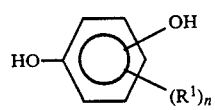 (II)

such as hydroquinone, resorcinol or homologs thereof, such as methylhydroquinone, 2,5-dimethylhydroquinone, 2,3,5,6-tetramethylhydroquinone and 2-methylresorcinol. Preference is given to hydroquinone, resorcinol and 2,5-dimethylhydroquinone. Examples of suitable polynuclear dihydroxyl compounds are those in which two alkyl- or alkoxy-substituted or unsubstituted phenol radicals are linked via a direct bond or by atoms or groups such as alkylidene, oxygen or carbonyl. The compounds may be described by the formula III

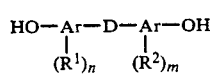 (III)

where Ar is an arylene radical, preferably phenylene, which may be substituted by groups $R^1$ and $R^2$. $R^1$ and $R^2$ are halogen, preferably bromine, alkyl groups or alkoxy groups, in each case having 1 to 8, preferably 1 to 4, carbon atoms, and aryl or aryloxy groups, where aryl is preferably phenyl. m and n are zero or integers 1, 2, 3 or 4. D is a $C_{1-3}$-alkylidene group, which is optionally substituted by halogen, preferably fluorine, or by an aryl ring, or is a $C_6$-cycloalkylidene group (in the case of bisphenols prepared from optionally substituted phenols and oxo compounds, such as acetone, formaldehyde, cyclohexanone, etc.), or a direct bond and includes the groups:

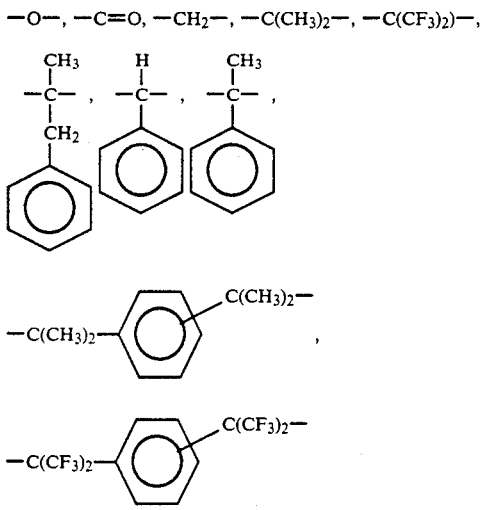

Examples of such compounds of the formula (III) are bis(4-hydroxyphenyl)methane, 3,4'-dihydroxydiphenyl, 4,4'-dihydroxybenzophenone, 4,4'-dihydroxydiphenylether, bis-(3,5-dimethyl-4-hydroxyphenyl)methane, 2,2-bis(4-hydroxyphenyl)-1-phenylpropane, 1,1-bis(4-hydroxyphenyl)-1-phenylethane, 1,3-bis(4-hydroxyphenylisopropylidene)benzene, 1,3-bis(3,5-dimethyl-4-hydroxyphenylisopropylidene)benzene, 1,3-bis(4-hydroxyphenyl-1,1,1,3,3,3-hexafluoroisopropylidene)benzene, 1,3-bis(3,5-dimethyl-4-hydroxyphenyl-1,1,1,3,3,3-hexafluoroisopropylidene)benzene, 2,7-dihydroxynaphthalene, 2,3-dihydroxynaphthalene, 1,4 -dihydroxynaphthalene, 2,7-dihydroxy-9-fluoroenone, and the preferably employed compounds 2,2-bis(4-hydroxyphenyl)propane (bisphenol A), 2,2-bis(3,5-dimethyl-4-hydroxyphenyl)propane, 2,2-bis(3,5-dibromo-4-hydroxyphenyl)propane, 2,2-bis(4-hydroxyphenyl)-1,1,1,3,3,3-hexafluoropropane, 3,3'-dihydroxydiphenyl, 4,4'-dihydroxydiphenyl, 3,3'-5,5'-tetramethyl-4,4'-dihydroxydiphenyl, 3,3'-5,5'-tetramethyl-4,4,-dihydroxybenzophenone, 2,2-bis(3,5-dimethyl-4-hydroxyphenyl)-1,1,1,3,3,3-hexafluoropropane, 1,4-bis(4-hydroxyphenylisopropylidene)benzene, 1,4-bis(3,5-dimethyl-4-hydroxy-phenylisopropylidene)benzene, 1,4-bis(4-hydroxyphenyl-1,1,1,3,3,3-hexafluoroisopropylidene)benzene, 1,4-bis(3,5-dimethyl-4-hydroxyphenyl-1,1,1,3,3,3-hexafluoroisopropylidene)benzene, 1,5-dihydroxynaphthalene, 2,6-dihydroxynaphthalene, 5-hydroxy-3-(4-hydroxyphenyl)-1,1,3-trimethylindane, 5-hydroxy-3-(3,5-dimethyl-4-hydroxyphenyl)-1,1,3,4,6-pentamethylindane, 6,6,-dihydroxy-3,3,3',3'-tetramethyl-1,1'-spirobiindane.

The activated aromatic dihalogenated compounds (A') are mononuclear or polynuclear compounds whose halogen atoms have been activated by electronegative substituents in the o- or p-position to them. In polynuclear compounds, the halogen atoms are preferably on different benzene rings; in this case the electronegative substituents may be the bridging member between the benzene rings. Suitable dihalogenated compounds of this type are 1-(2'-chlorobenzoyl)-4-(4'-chlorobenzoyl)benzene and 1-(2'-chlorobenzoyl)-3-(4'-chlorobenzoyl)benzene, but preferably 4,4'-dichlorobenzophenone, 4,4'-difluorobenzophenone, 1,4-bis(4'-fluorobenzoyl)benzene, 1,4-bis(4'-chlorobenzoyl)benzene, 1,3-bis(4'-fluorobenzoyl)benzene, 1,3-bis(4'-chlorobenzoyl)benzene and 1-(2'-fluorobenzoyl)-4-(4'-fluorobenzoyl)benzene.

The condensation reaction is carried out either without a solvent or in the presence of an inert solvent in which the polymer formed is soluble at the reaction temperature. Examples of suitable solvents are: diphenyl sulfone, N-cyclohexyl-2-pyrrolidone, cyclic aromatic sulfones, such as dibenzothiophene S,S-dioxide or, less preferred, benzophenone and cyclic aromatic ketones, such as 9- fluorenone. Solvents of this type are described, inter alia, in German Offenlegungsschrift 2 803 873.

Other suitable solvents are N,N-dimethylformamide, N,N-dimethylacetamide and N-methyl-2-pyrrolidone. In this case, a suitable entrainer (for example toluene) should be added to the reaction mixture.

The lower limit to the reaction temperature is set by the melting point of at least one of the components or of the solvent and the upper limit is set by the decomposition temperature of the condensation partners or of the solvent optionally used. The reaction temperature is generally between 100° and 400° C., preferably between 150° and 350° C., and depends, inter alia, on the reactivity of the condensation partners and on the type of solvent used. The reaction is preferably commenced at a low temperature, and the temperature is increased gradually or stepwise if the viscosity of the reaction material increases.

The limiting viscosity, determined in accordance with DIN 51 562, of the polyaryl ether ketones mentioned, as a measure of their molecular weight, measured in a solution of 0.1 g of the polymer in 100 ml of chloroform at 25° C., may be in the broad range of from 0.2–2.5 dl/g, preferably 0.4–1.5 dl/g. The polyether ketones mentioned have an MFI (melt flow index) (5 minutes melting time at 270° C.) of 4–100 g/10 min, preferably 8 –80 g/10 min, in particular 15–80 g/10 min (in accordance with DIN 53 735).

The transparency of the polyaryl ether ketones according to the invention is high and depends to a limited extent on the presence of impurities, which may be present as residual salt or residual solvent depending on the preparation method. Appropriate purification steps, which may comprise, for example, repeated washing, repeated reprecipitation, but also filtration of the polymer solution or the polymer melt, improve the transparency of the amorphous polyaryl ether ketones. The transparency or cleanliness of the material is always assessed in combination with concrete applications.

The refractive indices of the polyaryl ether ketones according to the invention are very high overall and depend on the chemical structure of the polyaryl ether chain. By choosing certain monomer units, refractive indices in the range from 1.55 to 1.70, preferably 1.60 to 1.68, in particular between 1.62 and 1.67, can be produced.

The lower water absorption capacity of the polyaryl ether ketones is also advantageous. It is very low, with values between 0.1 and 0.5% at 23° C. and 85% relative humidity. Water absorption capacities of between 0.1 and 0.4% are preferred. These values for the water absorption capacity are considerably lower than in the polyether imides or polyamides employed hitherto for the production of alignment layers.

The polyaryl ether ketones mentioned are amorphous. Their glass transition temperatures, according to DSC measurements (differential scanning calorimetry) at 20° C./min., are above 155° C., and are thus above the glass transition temperature of polycarbonate. Glass transition temperatures of above 160° C. are preferred.

The densities of the amorphous polyaryl ether ketones are generally below those of polyaryl ether sulfones or polyaryl ether imides. Depending on the chain structure chosen, densities of between 1.2 and 1.4 g/cm$^3$ are measured. Values for a density of below 1.35 g/cm$^3$ are preferred.

Conventional assistants, such as stabilizers, UV absorbers, brighteners, mold-release agents and antistatics can be incorporated without impairing the properties described.

Alignment layers of the invention can be produced from polyaryl ether ketone solutions, for example in N-methyl-2-pyrrolidone, having polymer contents of from about 0.1 to 5% by weight. These solutions are inert and have a very long shelf life. The polyaryl ether ketone solutions can be used to produce so-called wet films, which solidify even at temperatures below 100° C. and can thus be hardened, since they are not reactive and also need not be chemically modified. These alignment layers are not dissolved at all by conventional liquid-crystal substances based on phenylpyrimidine or phenylcyclohexane and have smooth, defect-free surfaces with no cracks or other inhomogeneities.

The alignment effect was tested on LCD cells whose alignment layer has been produced from polyaryl ether ketones containing structural units of the formula I and used according to the invention. To this end, the maximum light absorption of the filled cell is measured between crossed polarizers. The contrast values obtained on dynamic electric addressing are a measure of the quality of the alignment capability. In addition, the visual impression obtained by polarized-light microscopy is concomitantly used to assess the contrast capability. The alignment layers produced from polyaryl ether ketones surprisingly give particularly high contrast values in ferroelectric cell types, compared with alignment layers made from polyether imide of the prior art.

EXAMPLES 1) 192.5 g of 1,4-bis(4'-fluorobenzoyl)benzene, 137 g of 2,2-bis(4-hydroxyphenyl)propane (bisphenol A), 100 g of Na$_2$CO$_3$ and 400 g of diphenyl sulfone are melted in a 2 l four-necked flask equipped with stirrer and internal thermometer while flushing with inert gas. The reaction mixture was stirred at 230° C. for 3 hours. The temperature of the mixture was subsequently increased to 240° C., and the mixture was stirred for a further 1.5 hours and finally stirred at 250° C. for a further 1.5 hours. The reaction mixture was poured out, cooled, comminuted and finally ground. The pulverulent product was washed several times with acetone and water and finally dried for 12 hours at 140° C. under reduced pressure. The white powder obtained had a glass transition temperature (Tg) of 160° C. and an inherent viscosity of 0.64 dl/g, measured at 25° C. in a chloroform solution containing 0.1 g of polymer in 100 cm$^3$ of solution. Melting gave a transparent molding composition.

2) 192.5 g of 1-(4'-fluorobenzoyl)-4-(2'-fluorobenzoyl)benzene and 66 g of hydroquinone were reacted in the manner described in Example 1. A product having an inherent viscosity of 0.72 dl/g and a Tg of 155° C. was obtained. In the molten and subsequently solidified state, the material is transparent.

3) 201.6 g of 2,2-bis(4-hydroxyphenyl)hexafluoropropane (6F-bisphenol A) were reacted with 130.8 g of 4,4'-difluorobenzophenone in the manner described in Example 1. The polymer obtained had a Tg of 140° C. and an inherent viscosity (measured under the conditions mentioned in Example 1) of 0.40 dl/g. In the molten and subsequently solidified state, the material is transparent.

4) 123 g of bisphenol A and 6.6 g of hydroquinone were reacted with 192.5 g of 1,4-bis(4'-fluorobenzoyl)benzene in the manner described in Example 1. The polymer obtained had a Tg of 163° C. and an inherent viscosity (measured under the conditions mentioned in Example 1) of 0.70 dl/g. In the molten and subsequently solidified state, the material is transparent.

5) Preparation of polymer layers on glass substrates 1.5% strength by weight and 5% strength by weight of solutions of each of the polymers of Examples 2 and 3 in γ-butyrolactone were applied to glass substrates in various coating thicknesses. The application was effected by conventional spin-coating (30 seconds) at various rotational speeds, forming wet films of various thickness, which was subsequently dried for 2 hours at 150° C. Defect-free, homogeneous polymer layers were obtained in the following thicknesses (in μm):

|        | Polymer from |      |           |
|--------|--------------|------|-----------|
|        | Example 2    |      | Example 3 |
| R.p.m. | 1.5%         | 5%   | 5%        |
| 7000   | 10           | 45   | 40        |
| 4000   | 15           | 55   | 50        |
| 2000   | 25           | 85   | 75        |
| 1000   | 40           | —    | —         |

6) 1.5% strength by weight solutions of each of the polymers of Examples 1 to 4 in anhydrous N-methylpyrrolidone were prepared, and 0.1% by weight, based on the solution, of γ-aminopropyltriethoxysilane was added to these solutions. The resultant solutions were each spincoated at 3000 rpm onto glass substrates or onto indium/tin oxide-coated glass substrates for 30 seconds, and the wet films produced were subsequently dried at 90° C. in a drying oven under reduced pressure. In spite of the low drying temperature of 90° C., very good adhesion of the polymer layers of the invention to both types of coated glass substrate were achieved.

7) In order to provide evidence of the advantageous applicational properties of the polyaryl ether ketones as alignment layers in electrooptical switching and display devices, a twisted nematic cell of the Schadt-Helfrisch type (cf. M. Schadt, W. Helfrisch, Appl. Phys. Lett. 18 (1971), 127) was produced. To this end, an indium/tin oxide-coated electrode structure of 4×4 mm was in each case produced on glass substrates, cleaned, dried, coated with the polymer from Example 1 and rubbed. In each case, two of the coated glass substrates obtained in this way were bonded together using spacers to form a cell having an internal electrode separation of 4.6 μm, the rubbing directions on the polymer surfaces of the two glass substrates being rotated by 90° to one another. The cell was filled with the nematic liquid-crystal mixture ZLI 1565 (manufacturer: E. Merck, Darmstadt, Federal Republic of Germany) with addition of 0.1% by weight, based on ZLI 1565, of 4R-(nonyloxypyrimidin-5-yl)phenyl 2,2-dimethyl1,3-dioxolane-4-carboxylate, and the electrooptical effect was tested or demonstrated by applying or switching off a voltage. When the alignment layers made from the polyaryl ether ketone of Example 1 were used, the threshold voltage $U_{10}$ was 2.4 volts (10% increase in intensity), and the $U_{90}$:$U_{10}$ ratio was 1.44 (at 25° C.). This provides evidence of an electrooptical effect.

8) Use for ferroelectric liquid-crystal displays. In order to test the advantageous applicational properties of the polyaryl ether ketones as alignment layers in ferroelectric displays, a cell was produced as described in Example 7, using the polymer from Example 1, but with the difference that the rubbing directions on the polymer surfaces of the two glass substrates were parallel to one another and the electrode separation was 1.9 μm. The cell was filled with a ferroelectric test mixture based on phenylpyrimidines having a spontaneous polarization of 17 nC/cm² (25° C.) and the contrast was measured in a pulse experiment, as described in Hughes and Saunders, Liquid Crystals 3 (10), 1401-1410 (1988). The contrast ratio, i.e. the quotient of the transmission values in the bright and dark switching states, was 55:1 for the polyaryl ether ketone from Example 1. An identical cell of the same construction, but coated with a commercially available alignment layer (Hitachi PIX 1400, manufacturer: Hitachi Chemicals Co. Ltd, Tokyo, Japan), was used for comparison, contrast ratio 16:1.

9) Transparency measurement. The extinction coefficient of the polyaryl ether ketone (PAEK) of Example 1 and of a polyether imide ®ULTEM 1000 (manufacturer: General Electric Co., Schenectady, N.Y., USA) was determined using a spectrophotometer at a wavelength of 500 nm. PAEK: 132.2 m$^{-1}$, ULTEM 1000 (comparison): 436.0 m$^{-1}$.

The high transparency has an advantageous effect on the use of the polyaryl ether ketones according to the invention in LCDs.

10) Water absorption capacity The water absorption capacity of a polyaryl ether ketone employed according to the invention and of commercially available polymers which are used as alignment layers for liquid-crystal displays was determined at 85% relative humidity and 23° C., and the values obtained were compared:

|  | Water absorption |
| --- | --- |
| Polyaryl ether ketone, Example 1 | 0.35% |
| Nylon 6 | 2.4% |
| Polyether imide (ULTEM 1000) | 1.0% |

This Example shows that polyaryl ether ketones are highly suitable for the production of liquid-crystal displays whose constituents may be affected in function by moisture in the alignment layer.

We claim:

1. An alignment layer for liquid-crystal display and switching devices, produced from at least one amorphous, aromatic polyaryl ether ketone with a limiting viscosity of from 0.2-2.5 dl/g, measured in a solution of 0.1 g of polymer in 100 ml of chloroform at 25° C., which is built up from at least one structural unit of the formula I $$—O—A—O—B—\qquad(I)$$

where A is selected from the radicals

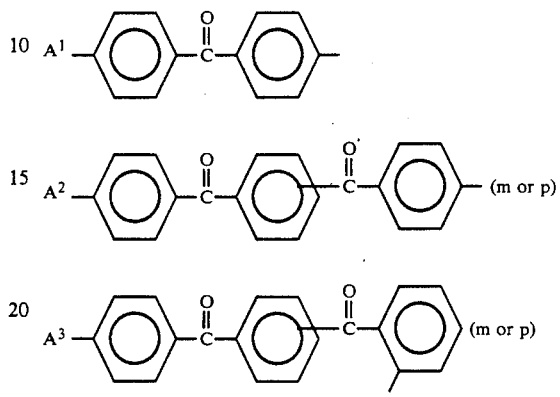

and B is selected from the radicals

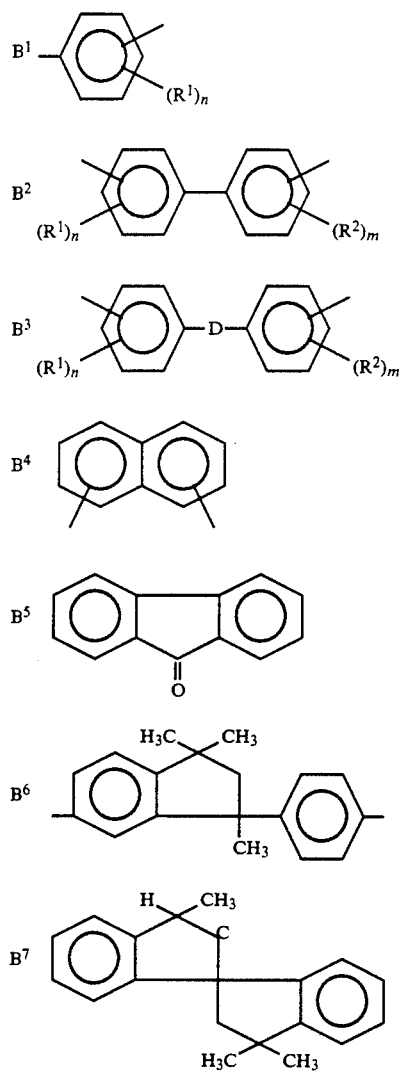

-continued

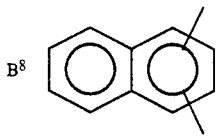

where $R^1$ and $R^2$, which are identical or different, are halogen, $(C_1-C_8)$-alkyl or -alkoxy, m and n are identical or different and are zero or an integer from 1 to 4, and D is selected from the divalent radicals.

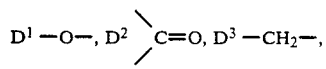

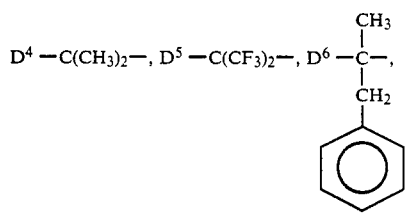

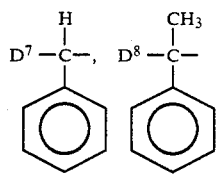

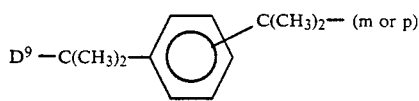

the molar ratio between the units A and B being from 0.9 to 1.1:1.0.

2. An alignment layer as claimed in claim 1, wherein $R^1$ and $R^2$ are bromine, $(C_1-C_4)$-alkyl or -alkoxy, m and n are the values zero, 1 or 2 and the molar ratio between the units A and B is 1:1.

3. An alignment layer as claimed in claim 1, wherein a homopolycondensate or copolycondensate of the polyaryl ether ketone is employed.

4. An alignment layer as claimed in claim 3, wherein, in copolycondensates, the polyaryl ether ketone contains 0–50 mol% of units $A^2$ and 50–0 mol% of units $A^3$, in the presence of $B^1$, $B^2$ and $B^4$.

5. An alignment layer as claimed in claim 3, wherein, in copolycondensates, the radical A is selected from $A^1$, $A^2$ and $A^3$ and the radical B) contains 0–50 mol% of units $B^1$ and 50–0 mol% of units selected from $B^2$ to $B^8$.

6. An alignment layer as claimed in claim 1, wherein group A present in the polyaryl ether ketone is a radical $A^1$ or $A^2$, group B is a radical $B^1$ to $B^3$, group D is a radical $D^2$ to $D^{10}$.

7. An alignment layer as claimed in claim 1, wherein groups A, B and D are linked in the para-position.

8. An alignment layer as claimed in claim 1, wherein the polyaryl ether ketone has at least one of the following characteristics:
 a) a limiting viscosity of 0.4–1.5 dl/g (0.1 g of the polymer in 100 ml of chloroform, 25° C.),
 b) an MFI of 4–100 g/10 min, (5 minutes melting time at 270° C.),
 c) a refractive index in the range from 1.55 to 1.70.
 d) a water absorption capacity of 0.1 to 0.5% at 23° C. and 85% relative humidity, and
 e) a density between 1.2 and 1.4 g/cm³.

* * * * *